March 13, 1934.  P. F. G. B. VON OBERSTADT  1,951,224
MASTER CYLINDER FOR BRAKES
Filed Oct. 24, 1932  3 Sheets-Sheet 3
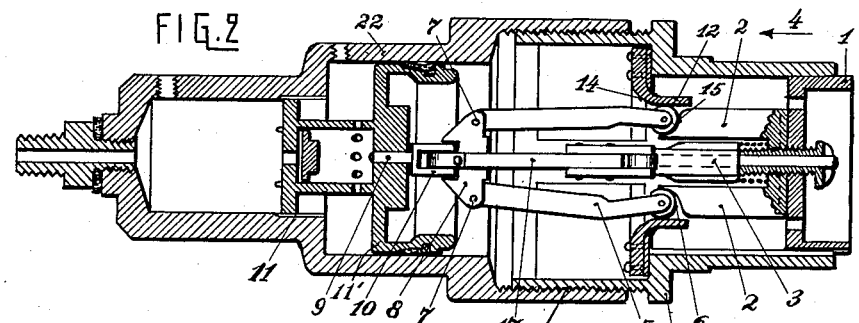
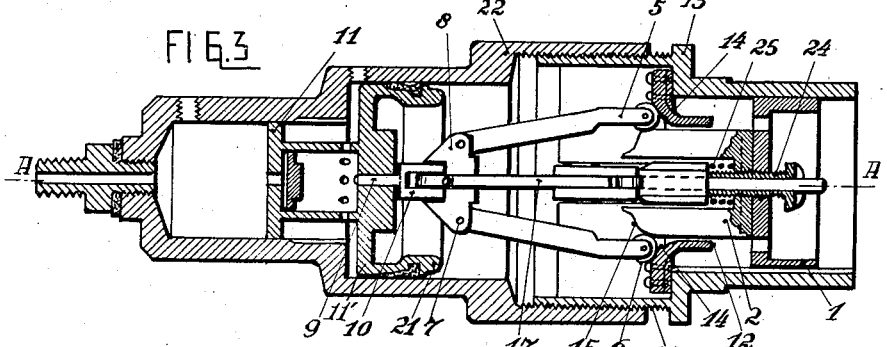
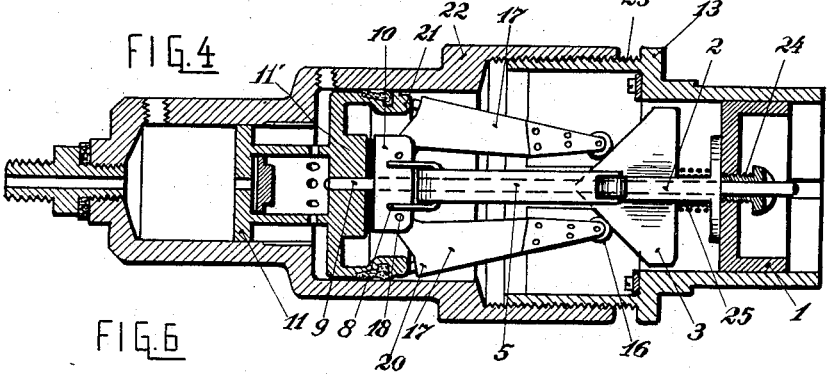
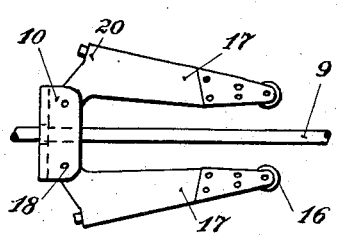
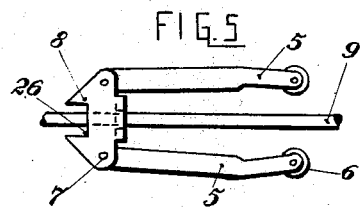
INVENTOR
Peter Franz Graf Bopp Von Oberstadt
By Robt. A. Cobb
ATTORNEYS Patented Mar. 13, 1934

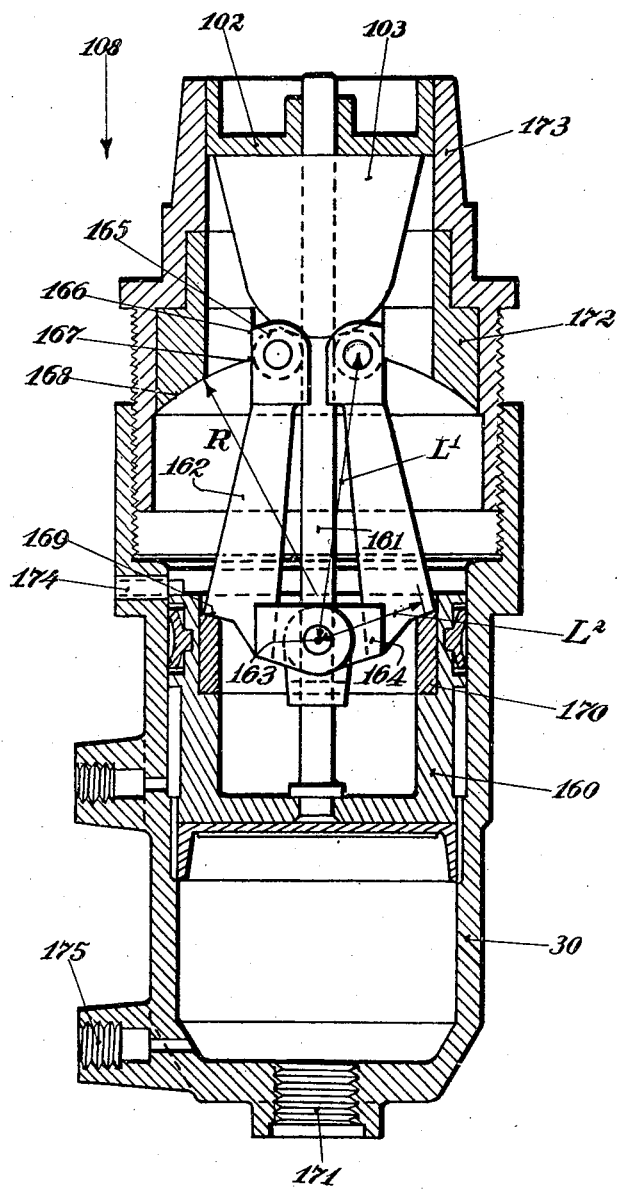

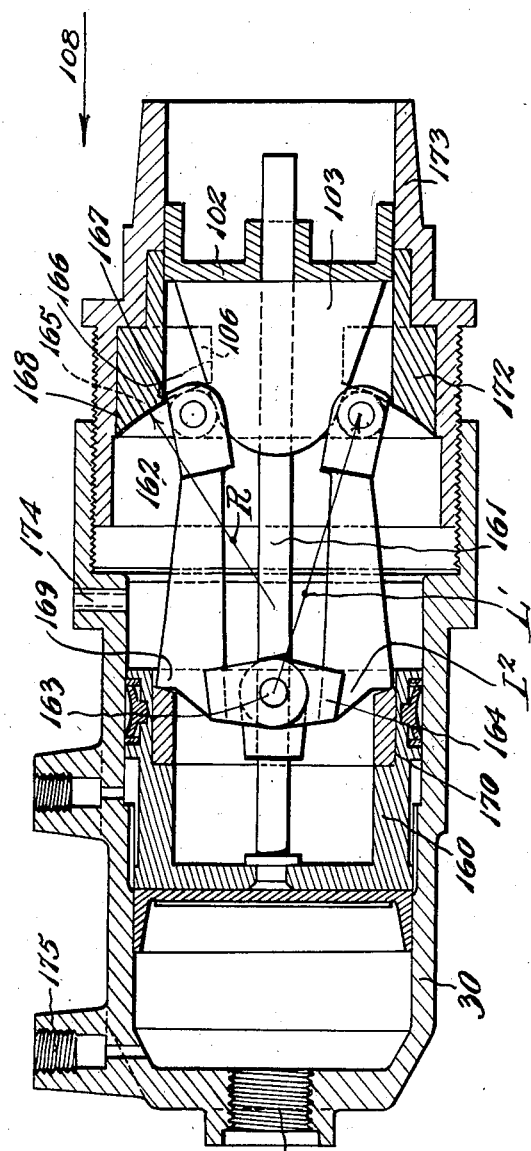

1,951,224

UNITED STATES PATENT OFFICE 1,951,224

MASTER CYLINDER FOR BRAKES

Peter Franz Graf Bopp von Oberstadt, Berlin-Halensee, Germany

Application October 24, 1932, Serial No. 639,362
In Germany June 22, 1931

15 Claims. (Cl. 60—54.6)

The present invention relates to improvements in or relating to fluid pressure braking devices for vehicles and more particularly to the main pressure cylinder (so called master cylinder) of such devices, in which the fluid pressure is produced which by means of conduits connected to the master cylinder brings the brake shoes or blocks on the wheels of the vehicle first of all to bear against the brake drums and then to press firmly against them. As is known the brake shoes must travel a certain distance in going from their position of rest to their position against the brake drums whilst the distance from this position to the point at which they exert full pressure is practically zero. Further in order to bring the shoes against the drum a relatively small fluid pressure is required whilst for pressing against the drum a very strong pressure is necessary. From these considerations the operating conditions for the master cylinder are given (main pressure cylinder). The piston of the main pressure cylinder has up to a certain point to traverse a displacement volume corresponding to the path of the brake shoes until they bear against the brake drum, with low pressure and then to displace a small pressure volume at high pressure, corresponding to the pressure exerting part of the path of the brake shoes. It is important in this connection that the change of the displacement and pressure in the main pressure cylinder shall be accurately adjustable to the placing of the brake shoes against the drum and to the pressing action and particularly it should be capable of easy adjustment after the master cylinder has been mounted on the vehicle and after the brake shoes have become worn. Further it is important that the very strong back pressure set up when the brakes are applied shall have the least possible effect on the operating pedal. The braking devices hitherto known could not satisfactorily fulfil the requirements of actual practice.

According to the present invention a gear is interposed between the main pressure cylinder and the operating means, the transmission ratio of the gear being changeable to another ratio automatically at an adjustable position corresponding to the necessary displacement volume in such manner that upon completion of displacement through the displacement volume the main pressure cylinder piston receives a smaller velocity during the traversal of the subsequent pressure volume. By means of a suitable device, the means which brings about the ratio change of the intermediate gear upon completion of the traversal of the displacement volume corresponding to the positioning of the brake shoes against the brake drum, can be accurately adjusted to the operative conditions of the braking device, so that after the brake blocks or shoes have become somewhat worn the piston is to be set back only the same small distance for the pressure volume as in the original condition of the unworn braking device.

In order that the invention may be well understood two preferred embodiments thereof will now be described by way of example only with reference to the accompanying drawings in which:—

Figure 1 is a longitudinal section through a master cylinder with a single piston, Figure 1A is a view similar to Figure 1, but showing the parts in another position of operation;

Figure 2 is a longitudinal section through another master cylinder of another form.

Figure 3 shows another position of the parts of the master cylinder shown in Figure 2, Figure 4 is a section on the line A—A of Figure 3, Figures 5 and 6 are respectively views of the lever gears shown in Figures 2 and 3 and 4 respectively.

In the embodiment according to Figure 1 the master cylinder is provided with a single piston 160, and in this case a gear is inserted between the operating member 102 and the piston 160, the transmission ratio of the said gear being automatically changed at a point which is accurately adjustable in accordance with the necessary displacement volume, so that after completion of the traversal of the displacement volume the piston receives a smaller velocity during the subsequent traversal of the pressure volume. A disc like driving member 102 connected with the operating rod is loosely mounted on the piston rod 161 and carries on one side a cam 103. The transmission of the motion of the driving member 102 to the piston 160 takes place through a gear interposed between these two members, and comprising bell crank levers 162 which are hinged at one end of the point 163 to a sliding member 164 slidable on the piston rod 161 and at their other ends they bear against the cam 103 by means of rollers 165. These rollers are moreover guided by special guide tracks which for the first part 166 run parallel to the piston rod and then suddenly at the corner 167 pass into a circular track 168 with radius R. If the driving member 102 is moved in the direction of the arrow 108, the piston 160 is first moved in the cylinder 30 with the same velocity as the driving member 102, being urged along by reason of the corners 169 of the levers 162 bearing against a steel ring 170 arranged within the piston 160. This movement is continued until at the end of the displacement stroke the rollers 165 have reached the corners 167 and then upon further forward movement of the driving member 102 the rollers diverge along the arcuate tracks 168. Then the reduction gear between the driving member 102 and the piston 160 comes into operation, the transmission ratio of which is determined by the ratio of the lengths $L^1:L^2$ and the magnitude of the radius R of the guide track 168 which is preferably chosen smaller than the length $L^1$, so that now the piston is moved with a smaller velocity than the driving member 102 during the subsequent traversal of the pressure volume. The rollers 165 run on the cam 103 only with the middle part of their width and with their outer parts they bear against the guide tracks 166, 168. If as set forth above the radius R is selected so as to be smaller than the distance $L^1$ between the hinge point 163 of the lever 162 and the axis of the roller 165, the back pressure of the roller tracks 168 on the rollers 165 gives a component by means of which the rear end of each lever 162 is forced inwardly that is to say it is continuously held against the cam 103. Consequently in this embodiment no springs are necessary to urge the rear ends of the levers inwards. By suitable choice of the lever ratio $L^1:L^2$, of the radius R and the track of the cam 103 the magnitude of the desired reduction can be determined with ease.

The position of the corner 167 which gives the automatic change over the ratio of the transmission gear 162 between the driving member 102 and the piston 160 at the instant when the displacement stroke has been completed and the pressure stroke commences can be easily adjusted by the device to be hereinafter described whereby easy adjustment to compensate for wear in the brake blocks can be effected. The tracks 166, 168 are mounted in a member 172 which is arranged in a housing 173. The housing 173 can be screwed in and out in the cylinder 30, so that the position of the corner 167 can be adjusted so that the change over the transmission ratio can be arranged to take place at the exact instant corresponding to the changed path of the brake shoes to their position against the brake drum.

The rear-most position of the piston is determined by a pin 174 screwed into the cylinder wall.

In front of the piston are two pipe connections 171, 175 of which the first serves to connect the conduits leading to the brakes and the second serves as a breather or replenishing pipe connection.

In the embodiment just described the piston of the main pressure cylinder is given the necessary motion to bring the brake shoes into contact with the brake drum and to apply the brake, by one and the same means. Consequently even during the application of the brake the whole of the pressure acting in the piston which often amounts to a considerable force presses on the operating rod and with unfavourable pressure relations may act to impede effective braking.

In Figures 2 to 6 a further embodiment of the main pressure cylinder is illustrated in which the main pressure cylinder piston is pushed by the operating rod until the end of the stroke corresponding to the displacement volume through the intermediary of one gear whereupon the latter is automatically cut out and the piston receives the necessary motion to apply the brakes through the intermediary of a second gear preferably of a different transmission ratio. The cutting out of the first gear takes place in such manner that a part of the back pressure acting on the piston is taken up by the gear which is cut out and so is removed from the operating rod so that the operator has no excessively large forces to overcome in applying the brake.

According to Figures 2 to 4 cams 2, 3 at right angles to one another are carried by the driving member 1 which is connected to the operating rod by means not shown. At the beginning of the motion in the direction of the arrow 4 the cams 2 bear against the rollers 6 rotatably mounted in the ends of the levers 5. The levers 5 are hinged at points 7 to a member 8 which is loosely threaded on the piston rod 9 and through the intermediary of the member 10 likewise loosely threaded on the piston rod 9 acts upon the piston 11, which piston produces the pressure on the fluid medium and acts in all respects similar to piston 160 of Figure 1. Piston 11' serves as a guide piston for piston 11. At first the rollers 6 are constrained by straight guides 12 carried by the housing 13 and therefore the cams 2 push the piston 11 through the agency of the gear 5—8, with the same velocity as their own. This motion continues until the part of the stroke corresponding to the displacement volume is completed, that is until the rollers 6 have reached the curved tracks 14 which are continuations of the tracks 12. The rollers are then forced outward by the curved parts 15 of the cams 2. The rollers 6 therefore pass out of effective engagement with the cams 2 as shown in Figure 3 so that a further movement of the piston 11 will not be effected by the first gear 5—8. This is the instant at which the brakes after completion of the low pressure period, have just come to bear against the brake shoes and now the conversion from low to high pressure occurs in the master cylinder. As shown in Figure 4, at this instant, the cams 3 which are at right angles to the cams 2 engage with the rollers 16 on the ends of the levers 17 of the second gear which are arranged at right angles to the levers 5. The levers 17 are pivoted at 18 to the member 10 which as stated is loosely threaded on the piston rod 9. The arrangement is such that upon further movement of the driving member 1 and the cam 3 the levers 17 are swung about the points 18 and thereby bear against a ring 21 secured to the piston 11 with their extensions 20. When the levers 17 bear against the ring 21, the plate 10, upon which levers 17 are pivoted, will tend to move to the right and press against member 8. Member 8 serves as an abutment as it is prevented from moving by levers 5 acting against member 12. Therefore, the greater portion of the back-thrust of the piston is taken up by guides 12 and the housing. The selected arrangement of the levers 17 gives a transmission ratio so that the piston 11 moves forward during the high pressure period with a lower velocity than that of the driving member 1, thus differing from the initial low pressure period. In general the path of the piston 11 during the high pressure is very small. As shown in Figure 3 the rollers 6 of the levers 5 lie in the angular space between the straight outer sides of the cam 2 and the track 14 during the high pressure period. The levers 5 therefore bear to some extent against the tracks 14 so that the back pressure of the piston is partially transmitted through ring 21, lever 17, pivots 18, member 10, member 8, and levers 5, to the wall of the housing. The cams 2 can slide during the small further movement under the rollers 6 without exerting any appreciable force on them. Consequently only about half of the back pressure reaches the driving member 1 and thence the operating rod during the high pressure period. The remainder in transmitted through the first gear to the wall of the housing.

Upon return of the member 1 at the end of the braking operation the rollers 6 under the action of the pressure on the piston 11 move inwards along the tracks 14 as soon as the cams 2 have receded sufficiently and again engage with the curve parts 15, the rollers 16 of the levers 17 at the same time coming out of engagement with the cams 3.

It is important that the rollers 6 can swing out along the curved tracks 14 exactly at the instant when the brake blocks have been brought into position against the brake drums. The position of the curved tracks 14 must therefore be movable and adjustable longitudinally. For this purpose the housing 13 carrying the curved tracks 14 is mounted in the cylinder portion 22 by means of a screw threaded mounting 23. On the other hand however it is also necessary that exactly at the instant when the levers 5 are swung out and cease to operate, the cams 3 shall engage with the rollers 16 of the second lever mechanism 17. For this purpose in the embodiment illustrated the cam 3 is adjustable longitudinally by means of a screw 24, the screw being secured against undesired automatic unscrewing by means of a spring 25.

As shown, particularly in Figures 5 and 6 the two lever mechanisms are made advantageously from two sheets of iron which are hinged to a suitably formed member 8 or 10. The one member 8 is provided with a recess 26 in which the other member 10 is fitted with its longitudinal axis at right angles to that of the member 8. Both lever mechanisms are loosely threaded on the piston rod 9.

In the embodiment illustrated the first gear has a transmission ratio 1:1 but it could if desired be constructed with a different transmission ratio.

The invention is applicable for use in the case of pistons having a single operating face as illustrated or stepped pistons, the latter having a plurality of operating faces of different areas disposed to produce different pressures according to which face or faces are rendered active. As an example of such a construction, reference may be had to U. S. Patent No. 1,369,915, granted March 1, 1921, to Harold D. Church, and particularly to piston members 13 and 14 thereof.

It will be understood that whilst I have described two preferred embodiments of my invention, various modifications may be made without departing from the scope thereof.

I claim:

1. In a hydraulic braking system for vehicles a main pressure cylinder, a piston in said cylinder, means for operating said piston, a housing for said piston operating means transmission gear interposed between said operating means and said piston and including a guide cam carried by said housing, and means for adjusting the position of said housing and guide cam relatively to said piston for automatically changing the transmission ratio of said gear at an accurately predetermined adjustable point of the piston stroke.

2. In a hydraulic braking system for vehicles, a main pressure cylinder, a piston in said cylinder, a piston rod, means for operating said piston, a sliding member slidably mounted on said piston rod, bell crank levers each pivoted at one end to said sliding member and bearing at its other end against the operating means and bearing adjacent its angle portion on the piston, and means for guiding the ends of the bell crank levers which bear against the operating means and for varying the ratio of transmission between said operating means and said piston at a predetermined point of the piston stroke.

3. In a hydraulic braking system for vehicles a main pressure cylinder, a piston in said cylinder, a piston rod, a member slidable longitudinally with respect to the cylinder and to the piston rod for operating said piston, a cam carried by said operating member, a sliding member slidably mounted on said piston rod, a pair of bell crank levers pivoted to said sliding member, said bell crank levers bearing adjacent their angle portions against said piston and bearing with their free ends against said cam, a pair of guide members constraining the free ends of said levers, said guide members each comprising a part running parallel to the cylinder axis and a curved part diverging from said cylinder axis.

4. In a hydraulic braking system for vehicles a main pressure cylinder, a piston in said cylinder, a piston rod, a member slidable longitudinally with respect to said cylinder for operating said piston, a cam carried by said operating member, a sliding member slidably mounted on said piston rod, a pair of bell crank levers pivoted to said sliding member, said bell crank levers each having a roller at its free end cooperating with said cam, and each bearing adjacent the angle thereof against the piston, a pair of constraining guides for guiding said rollers, said guides running parallel with the cylinder axis over a part of their length remote from the cylinder head and then diverging from said axis so that the bell crank levers cannot rotate about their pivots over the first part of the stroke of the piston whereby the piston moves with the same velocity as the operating member, and upon reaching the point of divergence of the guides swing outwards about their pivots and then move the piston with a smaller velocity than the operating member.

5. In a hydraulic braking system for vehicles a main pressure cylinder, a skirted piston in said cylinder, a piston rod, a member slidable longitudinally with respect to the cylinder for operating said piston, a cam carried by said operating member, a sliding member slidably mounted on said piston rod, a pair of bell crank levers pivoted to said sliding member and bearing adjacent their angle portions against the piston skirt, a roller carried by the free end of each piston rod and engaging over a part of its width with said cam, a pair of constraining guides bearing against said rollers over the parts of their widths not engaging with said cam said guides comprising straight portions parallel to the cylinder axis and adjoining curved portions diverging from said axis whereby upon reaching the curved portions of the guides, the levers are permitted to swing outwards about their pivots.

6. In a hydraulic braking system for vehicles a main pressure cylinder, an enlarged extension on said cylinder, a piston in said cylinder, a piston rod, a sleeve adjustably mounted in said cylinder extension, a piston operating member slidably mounted in said sleeve, a cam carried by said operating member, a sliding member slidably mounted on said piston rod, a pair of bell crank levers pivoted to said sliding member and bearing adjacent their angles against the piston, rollers carried by the free ends of said levers, guide members carried by said sleeve, the said guide members comprising straight guides parallel to the cylinder axis and adjoining curved guides diverging from said axis, the said cam and guide members being so arranged that upon inward movement of the operating member the rollers are maintained in engagement with the cam and the guides.

7. In a hydraulic braking system for vehicles, a main pressure cylinder, a piston within said cylinder, a piston rod, a piston operating member slidable longitudinally with respect to the cylinder, an inwardly facing cam carried by said operating member, a sliding member slidably mounted on said piston rod, a pair of bell crank levers each pivoted at one end to said sliding member and bearing adjacent their angles against said piston and cooperating at their other ends with said cam, and guide members for the free ends of said levers longitudinally adjustable with respect to said cylinder, the said guide members each comprising a straight portion parallel to the cylinder axis constraining the free ends of said levers to move parallel to the cylinder axis, and diverging arcuate portions, the radius of the arcuate portions being less than the distance of the pivots of the bell crank levers from their free ends, the cam and guides being so arranged that the free ends of the levers can follow the contour of the guides whilst engaging with the cam.

8. In a hydraulic braking system for vehicles a main pressure cylinder, a piston in said cylinder, means for operating said piston, a housing for said piston operating means, two transmission systems arranged between the piston and the operating means and including a guide cam carried by said housing, means for adjusting the position of said housing and guide cam relatively to said piston, and means for automatically effecting a change over from one transmission system to the other at a predetermined point of the piston stroke.

9. In a hydraulic braking system for vehicles a main pressure cylinder, a piston in said cylinder, means for operating said piston, two cams displaced by 90° with respect to each other carried by said operating means, two lever systems displaced by 90° with respect to each other and cooperating with said cams respectively and in driving engagement with said piston, constraining guides adjacent the path of the cam of the first transmission system, the said guides permitting the ends of the levers engaged by said cam to diverge outwards at a predetermined point in the stroke and no longer to transmit the motion of the cams thus permitting the second cam to come into operation and effect the further movement of the piston.

10. In a hydraulic braking system for vehicles a main pressure cylinder, a piston in said cylinder, a longitudinally movable member for operating said piston, two cams carried by said operating member and set at right angles, two lever systems arranged between said piston and said operating member and cooperating respectively with said cams, rollers carried by the levers cooperating with said cams, one of said cams having parallel sides, guide members adjacent said parallel sides and diverging at a certain point, whereby at this point the rollers cooperating with said cam are permitted to pass over the end of said cam to the sides thereof and to lie in the angles between the sides of said cam and the guides after which the motion is transmitted from the other cam through the corresponding lever system.

11. In a hydraulic braking system for vehicles a main pressure cylinder, a piston in said cylinder, means for operating said piston, two cams set at 90° to each other carried by said operating means, two lever systems displaced by 90° with respect to each other and cooperating with said cams respectively to transmit movement from said operating means to said piston and means for causing first one cam and lever system and then at a predetermined part of the stroke, the other cam and lever system to come into operative engagement to transmit movement from said operating means to said piston.

12. In a hydraulic braking system for vehicles, a main pressure cylinder, a piston in said cylinder, a piston rod, a member slidable with respect to said cylinder for operating said piston, a cam having parallel sides and carried by said operating member, a pair of guides running parallel to and adjacent to the parallel sides of said cam and diverging therefrom at a predetermined point, a sliding member slidably mounted on said piston rod, a pair of levers pivoted to said sliding member and engaging with their free ends with said cam and with said guides, a second cam carried by said operating member at right angles to said first cam, a second sliding member slidably mounted on said piston rod, a pair of bell crank levers pivoted to said second sliding member and engaging adjacent their angles with said piston and with their free ends engaging with said second cam, the arrangement being such that over the first part of the stroke the first pair of levers are constrained by the guides to engage with the ends of the first cam whereby the motion of the operating member is directly transmitted through the first pair of levers to the piston whilst after the first pair of levers have been permitted by the guides to pass over the end of the first cam these levers no longer transmit the motion of the cam, the motion of the operating member being then entirely transmitted through the second cam and the second pair of levers.

13. In a hydraulic braking system for vehicles a main pressure cylinder, a piston within said cylinder, a member slidable longitudinally of said cylinder for operating said piston, a piston rod, a cam carried by said operating member, a sliding member slidably mounted on said piston rod, a pair of levers pivoted to said sliding member, a pair of constraining guides, the free ends of said levers carrying rollers cooperating with said cam and with said guides, a second cam at right angles to said first cam and adjustably carried by said operating member, a second sliding member slidably mounted on said piston rod at right angles to said first sliding member, a pair of bell crank levers pivoted to said second sliding member engaging adjacent their angles with the piston and carrying rollers at their free ends, the said guides being so arranged that during the first part of the piston stroke the first cam and pair of levers are in operative engagement and at a predetermined point in the stroke the first cam and pair of levers are thrown out of operative engagement, the subsequent motion being transmitted through the second cam and pair of bell crank levers.

14. In a hydraulic braking system for vehicles a main pressure cylinder, a piston in said cylinder, a piston rod, an enlarged extension to said cylinder, a sleeve adjustably mounted within said extension, a piston operating member slidably mounted within said sleeve, a cam having parallel sides secured to said operating member, a pair of constraining guides carried by said sleeve and running parallel to and adjacent to the parallel sides of said cam for a part of their length and then diverging therefrom, a sliding member slidably mounted on said piston rod, a pair of levers pivoted to said sliding member and carrying rollers at their free ends, the said rollers cooperating with said cam and with said guides in such manner that over the first part of the piston stroke the rollers are constrained by the guides to cooperate with the end face of the cam, but can pass over said end face upon divergence of said guides, a second cam at right angles to the first cam, screw means for adjusting said second cam with respect to the operating member, a spring serving to prevent undesired turning of the screw means, a second sliding member slidably mounted on said piston rod, a pair of bell crank levers pivoted to said second sliding member and engaging adjacent their angles with the piston, the said bell crank levers carrying rollers at their free ends engaging with said second cam, the arrangement being such that at the aforesaid predetermined point of the piston stroke the first cam slides without transmitting motion past the rollers of the first pair of levers, whilst the second cam is in driving engagement with the rollers of the bell crank levers to transmit motion to the piston.

15. In a hydraulic braking system for vehicles a main pressure cylinder, a piston within said cylinder, means for operating said piston, two lever systems arranged between said operating means and said piston, cams carried by said operating means cooperating respectively with said lever systems, and means for causing first one cam and lever system and then the other to come into operation to drive the piston, the transmission ratio of the second lever system being lower than that of the first lever system.

PETER FRANZ GRAF BOPP von OBERSTADT.